United States Patent [19]

Miyazaki et al.

[11] 4,409,079

[45] Oct. 11, 1983

[54] METHOD OF METALLIZING SINTERED CERAMICS

[75] Inventors: Kunio Miyazaki, Hitachi; Yukio Okosi, Mito; Akira Kumagai; Hitoshi Suzuki, both of Hitachi, all of Japan

[73] Assignee: Hitachi, Ltd., Tokyo, Japan

[21] Appl. No.: 389,499

[22] Filed: Jun. 17, 1982

[30] Foreign Application Priority Data

Jun. 24, 1981 [JP] Japan ................... 56-98986

[51] Int. Cl.³ ............................................ C23C 15/00
[52] U.S. Cl. .................. 204/192 C; 427/34; 427/255
[58] Field of Search ............... 427/34, 255; 204/192 C

[56] References Cited

U.S. PATENT DOCUMENTS

| | | | |
|---|---|---|---|
| 2,887,984 | 5/1959 | Drummond | 427/255 |
| 3,850,690 | 11/1974 | Lee et al. | 427/255 |
| 3,856,557 | 12/1974 | Cuttell | 427/255 |
| 4,035,526 | 7/1977 | Konantz et al. | 427/255 |
| 4,146,656 | 3/1979 | Kinugawa et al. | 427/255 |
| 4,180,596 | 12/1979 | Crowder | 427/255 |
| 4,331,703 | 5/1982 | Lindmayer | 427/34 |
| 4,342,632 | 8/1982 | Heim et al. | 204/192 R |

Primary Examiner—Arthur P. Demers
Attorney, Agent, or Firm—Antonelli, Terry & Wands

[57] ABSTRACT

A method of metallizing ceramics in which, on a desired surface of a ceramic containing a silicon compound, a manganese-containing metal layer substantially free from any minute gaps with respect to the surface of the ceramics is formed, whereupon the resultant structure is heated to a temperature lower than the melting point of manganese to cause the reaction between manganese atoms and the silicon compound.

As a method for forming the metal layer, there is a method wherein a deposited film is formed by vacuum-evaporating or sputtering manganese metal or a manganese alloy or a method wherein a melt of a manganese-copper, manganese-nickel or manganese-titanium alloy is formed on the surface of the ceramic under the application of a pressure. The metallizing method can be conducted at a lower temperature and in a shorter period of time compared with a conventional metallizing method.

15 Claims, 8 Drawing Figures

METHOD OF METALLIZING SINTERED CERAMICS

BACKGROUND OF THE INVENTION

1. Field of the Invention

The present invention relates to a method of metallizing a surface of sintered ceramic containing a silicon compound as its component or an additive. More particularly, it relates to a method of forming a manganese layer or manganese-containing alloy layer of good adhesion on the desired surface of ceramics containing a silicon compound which is reactable with manganese to produce manganese silicide at a temperature lower than a melting point of manganese and in a short time, and a method of joining a film or a sheet of another metal onto the manganese layer or manganese alloy layer.

The metallized ceramics manufactured according to the present invention are put into various uses a direct materials and intermediate materials including substrates for semiconductor devices, electronic parts, mechanism parts, structural materials, etc.

2. Description of the Prior Art

Methods of metallizing sintered ceramics bodies, especially sintered alumina ceramics, have been known for a long time. The metallization of ceramics is very important in the provision of electrodes for ceramics capacitors, the provision of insulating sealing in electron tubes etc., the technology of joining semiconductor elements in semiconductor devices, the technology of wiring on the substrates of semiconductor devices, and so forth.

Regarding oxide-type ceramics such as alumina and beryllia, research has been conducted for several years, and there are various metallization methods. For example, as to the alumina ceramics, there is a method in which a mixed paste consisting of manganese powder and molybdenum powder is applied onto the ceramics and then baked. There have also been proposed pastes in which titanium hydride, aluminum oxide, silicon oxide, calcium oxide, etc. are mixed into the aforementioned powder (Japanese Laid-open Patent Application No. 55-113683).

The aforecited patent application discloses, in connection with a method of metallizing silicon carbide ceramics, a powdery metallizing composite which contains 100–10 parts by weight of at least one of group-IVa, -Va, -VIa and -VIIa metals and 0–90 parts by weight of at least one of group-Ib, -IIb, -IIIb, -IVb and -VIII metals. In the light of the description of the patent application including examples, the composite is applied onto a silicon carbide ceramic in the form of a paste and is heated so as to form a metal film on the surface of the ceramic. The paste is fired without liquefying (melting) during heating (at 1000° C.–1800° C.). For instance, a paste consisting of Cu powder (20 weight-%) and Mn powder (80 weight-%) is applied onto a silicon carbide ceramic and then baked in vacuum. In this regard, it is concluded that the metallized state is not good at a baking temperature of 800° C. In the specification of the patent application, the heating period of time for baking the paste is not clearly mentioned. Since, the diffusion of metal is utilized, the heating will require a long time.

A method wherein an alumina ceramic is metallized by the use of a paste consisting of molybdenum (80%)-silica (7–3%)-manganese dioxide (3–2%)-tungsten (5–15%), is disclosed in Japanese Laid-open Patent Application No. 54-58714. Herein, it is described that the metallizing temperature is 1370° C. and that the metallization is effected by diffusion bonding.

There has also been known a method wherein silicon nitride ceramics are metallized by diffusion bonding at 1550° C. with a paste which contains tungsten powder and manganese powder (Japanese Laid-open Patent Application No. 55-51774).

Any of these metallizing methods require heating the ceramics and the paste at a high temperature for a long time.

Alumina ceramics are used in large quantities chiefly as electronic parts and electronic materials. Silicon carbide ceramics have applications in the same fields as those of alumina ceramics, and may be used as industrial machine materials for gas turbines, sealing, etc.

If silicon carbide ceramics and alumina ceramics would be easily metallized at a lower temperature in a shorter time, undesirable thermal stresses on the ceramics would be reduced, and a saving of thermal energy as well as an enhancement of mass-producibility ought to be expected.

According to our recent researches, it has been revealed that when conventional pastes containing molybdenum powder or tungsten powder and optionally containing manganese powder are coated and fired on a ceramic substrate, an electric resistivity on the ceramic surface which has no coating of a fired paste or a metallic film is decreased due to diffusion of manganese or a deposition of vaporized molybdenum thereon. Because of the decrease in surface resistivity, it has also been observed that there is an increase in leak current on the ceramic surface. From the above point of view, it is desirable to carry out a metallization treatment at as low temperatures as possible in a short time.

SUMMARY OF THE INVENTION

An object of the present invention is to provide a metallizing method which can metallize sintered ceramic materials containing silicon compounds such as silicon carbide ceramics at a relatively low temperature and in a short time and which can form a metal film having a good adhesion to the ceramic surface.

The present invention is based on the finding of the phenomenon that, in a certain state for forming a metallized film on a ceramic substrate, a metallizing reaction is readily caused by a quite new mechanism which has not hitherto been predictable. More specifically, the above object has been accomplished by establishing the state in which manganese atoms or crystal grains in a layer of manganese or an alloy containing manganese can come closest to the crystal grains of silicon carbide or alumina constituting the ceramic substrate.

DESCRIPTION OF THE INVENTION (i) Ceramic materials

In the present invention sintered ceramics of silicon carbide and of alumina containing silicon oxide are typical ceramic materials. Silicon carbide and silicon oxide can react with manganese at lower temperatures than the melting point of manganese to produce manganese silicide, provided that a good reaction phase is formed between the ceramics and manganese.

According to our experiments, a strong bonding between a sintered silicon nitride ceramic and a manganese layer or a manganese alloy layer at a temperature lower than the melting point (1244° C.) of manganese could not be obtained, because bonding strength between silicon and nitrogen atoms is larger than that between silicon and manganese atoms at such low temperatures.

Ceramic materials usable in the present invention are ones which contain silicon compounds that are able to form manganese silicide at temperatures lower than the melting point of manganese.

Alumina ceramic sintered bodies generally contain several to about ten % by weight as one ingredient. This kind of alumina ceramics can also be used in the present invention.

(ii) Manganese-containing metal layer

In the present invention, the state in which manganese atoms or manganese crystals are closest to the silicon carbide crystal grains or alumina crystal grains of a ceramics substrate is intended to mean that substantially no factor for hindering the chemical reaction between the surface of ceramics and the manganese atoms exists therebetween during metallization.

As measures for establishing such state, there are the following methods:

(1) By vacuum-evaporating manganese onto the ceramic substrate, manganese crystallites or manganese atoms are stuck closely to the silicon carbide crystal or the alumina crystal. In an example, there has been obtained the surprising result that the metallization can be performed at 700° C. within 1 minute.

(2) A paste for metallization is prepared using the fine powder of manganese (having a particle size of at most 5 $\mu$m, particularly at most 2 $\mu$m), and the ceramic surface is coated therewith by a screen printing process or the like. When the paste is prepared with such superfine manganese powder, the manganese crystallites come closest to the silicon carbide crystal grains or alumina crystal grains, and any factor for hindering the reaction between manganese and the ceramic will be eliminated. Commercially available manganese powder is of several 10 $\mu$m however fine it may be, and such powder cannot readily react with the component of the crystal constituting the ceramic material.

Not only the manganese powder alone, but also a mixed system containing the powder of at least one other metal such as copper, nickel or titanium may be used. In this case, the metal or metals to be incorporated should be selected so as not to form a fragile compound with the ceramic or manganese.

In the paste an alloy containing manganese and copper, nickel, titanium or the like which is finely pulverized as stated above is used.

(3) The alloy of manganese and copper, nickel or titanium is deposited onto the ceramic substrate by the vacuum evaporation. In this case, it has been experimentally verified that since the vapor pressure of manganese is higher than that of copper, nickel or titanium, a manganese-rich film is formed on the ceramic surface and is overlaid with a layer rich in the other alloy component.

Such evaporated alloy film brings forth a function similar to that in method (1).

(4) A foil, wire or powder of a specified alloy containing manganese and copper, nickel or titanium is placed on the surface of the ceramic, and it is heated to or above the melting point of the alloy under the application of a pressure. Thus, the alloy is melted to form a liquid phase. The liquid phase formed in this way is in the state in which melted manganese is closet to the crystal grains of the ceramic substrate, and there is no longer a factor for hindering the reaction between the ceramics and manganese.

Especially preferable alloy compositions are 25–45% manganese-balance copper (melting point: 870° C.±approx. 10° C.), 70–50% manganese-balance nickel (melting point: 1018° C.±approx. 10° C.), and 42–43% manganese-balance nickel (melting point: 1175° C.±approx. 10° C.). With these alloys, the metallization can be effected at low temperature. In case of the invention disclosed in Japanese Laid-open Patent Application No. 55-113683 referred to above, even when a composition of copper (20%)-manganese (80%) is used, the metallization is first effected by a heating operation of at least 1000° C. for a long time. According to the present invention, a good metal film is obtained by heating at about 860° C. for only 1 minute or less.

In this method, the heating may be performed in the state in which a film of another metal, e.g., iron, copper, nickel, titanium or aluminum or a foil or sheet of an alloy consisting of such metals is placed on the manganese alloy layer. Further, silicon carbide ceramics or commercially available alumina ceramics may be placed on the manganese alloy layer. The pressure to be applied may be at least 0.01 kg/mm$^2$, and suffices with at most 1 kg/mm$^2$. The layer of manganese or manganese alloys can be formed by sputtering or plasma (flame) spraying using ultra-fine powder.

(iii) Bonding of Metal or Ceramics to Metallized Ceramics

The metallized ceramics may be bonded to other metals or ceramic, if necessary.

In case where a manganese-containing metal layer (it includes manganese layer itself) is formed by a technique of vacuum evaporation, sputtering, paste-printing and firing the coating or film, a plating of iron, copper, nickel or the like is formed on the metallized surface by an electro-plating or electroless-plating and the plating is then heated to a temperature to cause diffusion bonding (preferably lower than the metallization temperature) so as to strongly adhere the plating to the metallized surface, if necessary. In case of aluminum or titanium, the metal materials are coated on the metallized surface by vacuum evaporation or sputtering.

When a foil of managanese alloys such as manganese-copper alloy is used to form a manganese-containing layer on a ceramic, a foil, plate or wire of iron, copper, nickel, titanium, or alloys is superposed on the managanese-copper foil which is placed on the ceramic, and then the foils and ceramic are heated to a temperature lower than the melting point of manganese and the melting point of a metal foil to be bonded under a pressure of 0.01 kg/mm$^2$ or higher.

(iv) Surface Roughness of Ceramics

It has been found that the relationship between the surface roughness $\Delta H$ of silicon carbide ceramics or alumina ceramics and the particle size of the manganese powder or manganese alloy powder to be used is important in case of describing the closely stuck state between the ceramic surface and the manganese crystal or manganese atoms.

By way of example, when the surface roughness $\Delta H$ of the ceramics is represented by $\mu$m, the particle size of the manganese powder to be contained in the paste should be made smaller than the roughness ($\Delta H$). When the roughness is 5 $\mu$m or less, the particle size of the manganese powder is made smaller than 5 $\mu$m. In this way, the manganese particles can be closely stuck to the silicon crystal grains or alumina crystal grains.

In the case where the manganese film has been formed by evaporation, sputtering or flame spraying, the flying manganese particles are very small and therefore enter any minute recesses in the surface of the ceramics, so that the manganese particles or atoms and the crystals of the ceramics come closest to each other. Also in case the melt of the manganese alloy has been formed, this melt can enter any minute recesses in the ceramic surface.

In the manner described above, there is established the state in which the manganese atoms and the atoms in the reactive component of the ceramics are able to react.

In any of the foregoing methods (1)-(4), when the metallized ceramic is to be used as a substrate for an electronic circuit, the metallized film of manganese or the manganese alloy is formed into the shape of a selected pattern, and a conductor pattern of aluminum or copper is formed thereon.

Even when the methods (1)-(4) (vacuum evaporation, printing of the paste, and heating and melting of the alloy foil etc. under the pressure application) are replaced with sputtering and flame spraying employing superfine powder, similar metal films are obtained.

In case of silicon carbide ceramics, it is considered that manganese and silicon will react as indicated below, to metallize the ceramics. After a metallization treatment, the bonded surface was polished and then analyzed to detect liberated carbon atoms.

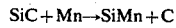

$$SiC + Mn \rightarrow SiMn + C$$

In metallizing silicon carbide ceramics by the method according to the present invention, therefore, it is essential to establish a state between the manganese atoms and SiC in which the above reaction is easy to take place.

On the other hand, in case of alumina ceramics, the metallizing mechanism has not been clarified yet. It is supposed, however, that $SiO_2$ which is a component contained in alumina ceramics will contribute to the chemical reaction with manganese to produce manganese silicide.

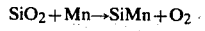

$$SiO_2 + Mn \rightarrow SiMn + O_2$$

BRIEF DESCRIPTION OF THE DRAWINGS

FIG. 3(a) and 3(b) are perspective views of a sample showing the points of a separation test, while FIG. 3(c) is a sectional view showing the tensional state of the separation test;

DETAILED DESCRIPTION OF EXAMPLES

Example 1

Figure 1:
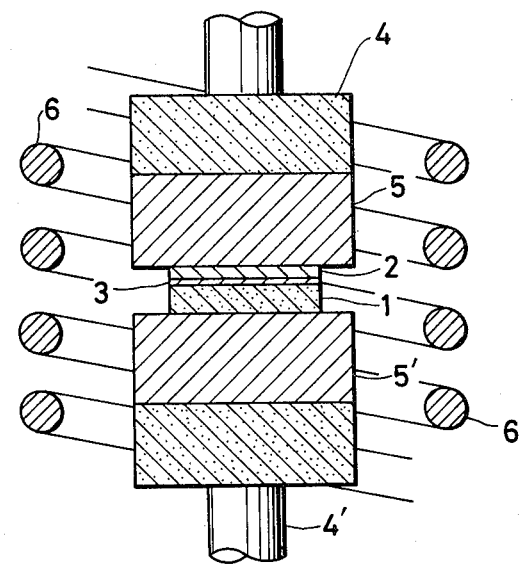
FIG. 1 is a sectional view of a heating portion in a metal-ceramics joining apparatus.

FIG. 1 is a sectional view of a heating portion showing joining jigs for manufacturing a metal-ceramic joint body according to the present invention. Numeral 1 designates ceramic, numeral 2 a metal foil, numeral 3 a manganese-copper foil, numeral 4, 4' ceramic supporters, numeral 5, 5' copper blocks, and numeral 6 an induction heating coil.

As the ceramic 1, there was used a sintered body of SiC which contained 2 weight-% of BeO. It was 1.5 mm thick and 15 mm square and the joint surface of which was finished up to a surface roughness ($\Delta H$) not greater than 5 $\mu$m. The metal 2 used was a copper foil which was 100 $\mu$m thick, and the foil 3 used was any of various foils which were 25 $\mu$m thick and were made of Mn-Cu alloys containing 1-60 weight-% of Mn. In the state in which a pressure of 0.05 kg/cm$^2$ was applied to the joint surface through the joining jigs 4, 4', the joint surface was heated to a predetermined temperature according to the kind of the foil 3 by high-frequency induction heating. The pressure was applied to the joint surface until the solidification of the melt of the foil 3 was completed.

A heating rate was about 1,000° C./minute, and the temperature at which a melt was formed was detected in terms of a change in the distance between the joining jigs 4, 4'. After the foil 3 reached its melting point, the heating portion was held for about 1 second, whereupon heating was stopped and the portion was immediately quenched (natural cooling). During the heating, argon gas was blown against the periphery of the joint surface so as to prevent the oxidation of the foil 3 and copper foil 2 as well as the copper blocks 5,5'. The greater part of an alloy layer once turned into the melt remained at the joint surface, but the melt was slightly exuded outside the joint portion.

Figure 2:
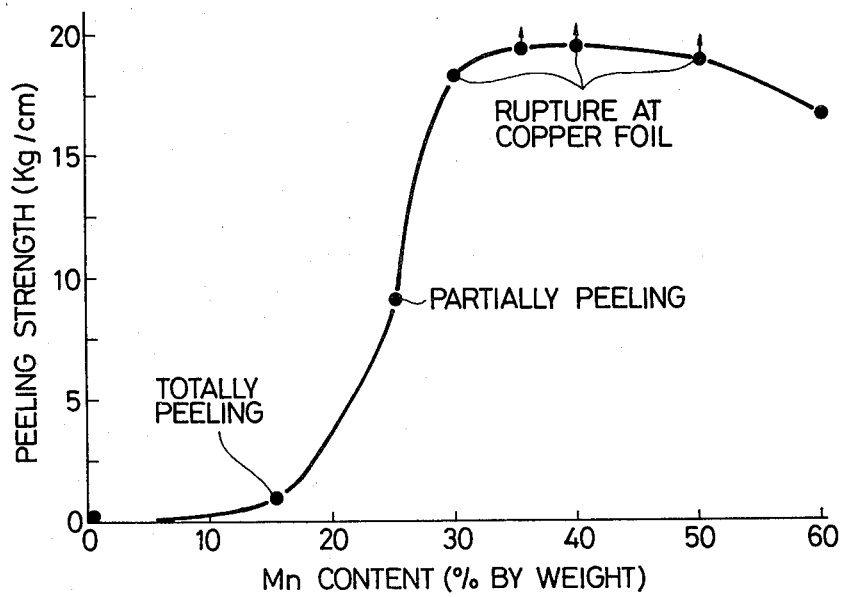
FIG. 2 is a graph showing the relationship between the Mn content of a manganese-copper alloy foil and the peeling strength of a joined body.

FIG. 2 is a graph showing the relationship between the Mn content of the Mn-Cu alloy foil and the peeling strength of joint body at the room temperature. As illustrated in the figure, when the Mn content of the foil is 30% or greater, the joint body ruptures at the copper foil. It is accordingly understood that an excellent joint is attained. When the Mn content is small, sufficient joining is not attained with the heating for a short time, and the joint body separates at the joint interface.

In FIG. 2, the metallization temperature at 15% Mn content was 930° C., at 25% Mn content it was 880° C., at 30% Mn content it was 870° C., at 35% Mn content it was 860° C., at 40% Mn content it was 870° C., at 50% of Mn content it was 900° C., and at 60% Mn content it was 940° C., respectively.

Figures 3A, 3B, 3C:
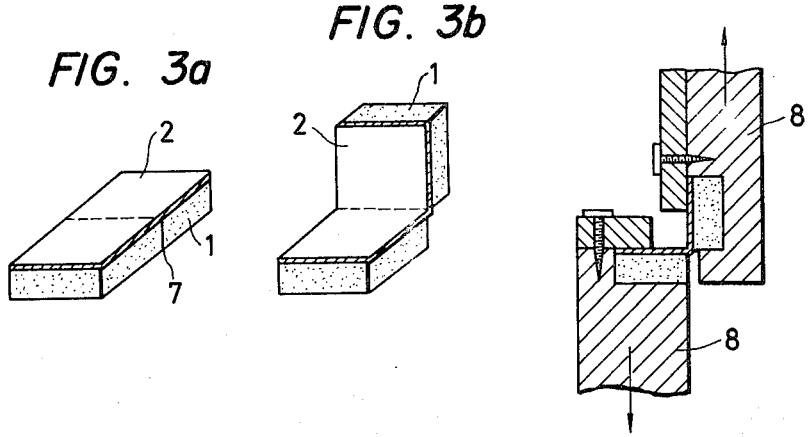

FIGS. 3a and 3b are perspective views of specimens showing the essentials of the peeling test used to provide the data in FIG. 2, and FIG. 3c is a sectional view showing the tensional state of a specimen. More specifically, FIG. 3a illustrates a metal-ceramic specimen in which a slit 7 is provided in the middle part of the ceramics 1, FIG. 3b the metal-ceramic specimen which is bent 90 degrees so as to divide the ceramics 1 into two, and FIG. 3c the metal-ceramic specimen in which the peeling test of the copper foil 2 is carried out by pulling the specimen in the directions of arrows by the use of pulling jigs 8. The area of the copper foil of the specimen shown in FIG. 3c was 3 mm×3 mm.

Regarding each sample which was ruptured at the copper foil in the peeling test of FIG. 2, the state of the interface between the SiC crystal grains and the alloyed layer (Manganese-containing layer) was observed with various means.

The joined copper foil and alloyed layer were etched and removed from the sintered SiC body, and the surface of the body was observed with a microscope. Then, it was found that the surface having been finished up flat before the joining had uneven parts as is seen in corrosion. It is considered that SiC and Mn reacted with each other, the reaction being one factor for the rigid bonding.

Example 2

As in Example 1, a foil having a thickness of 50 μm and made of an Mn-Cu alloy containing 37.8 weight-% of Mn and the balance of Cu was used; the ceramics and the copper foils were bonded with the foil at the various heating temperatures. The other joining conditions were the same as in Example 1. Samples thus obtained were subjected to the separation test at room temperature as described heretofore.

Figure 4:
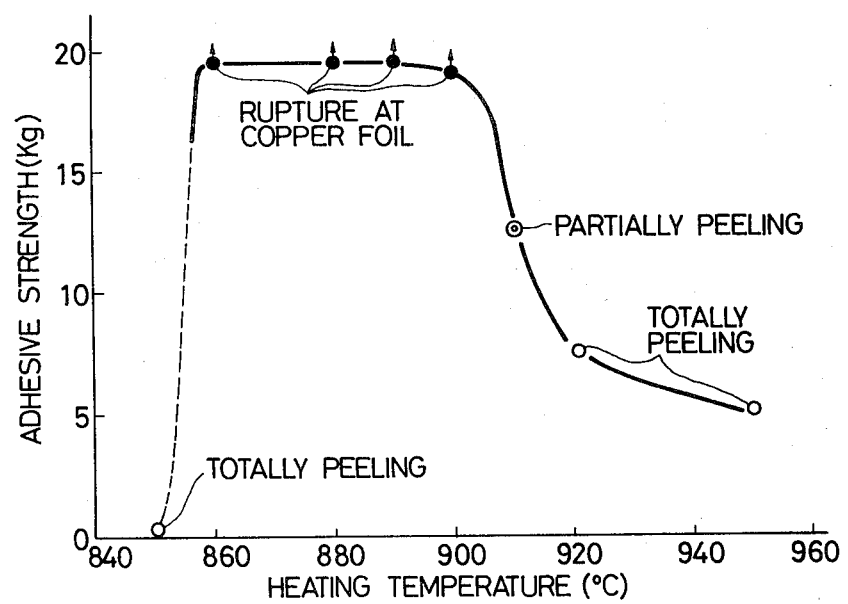
FIG. 4 is a graph showing the relationship between the joining temperature and the adhesive strength.

FIG. 4 is a graph showing the relationship between the heating temperature for metallization and the adhesive strength. The melting temperature of the foil is 860° C. As seen from the graph, in the case where the heating temperature is lower than the melting point of the Mn-Cu foil, the joining is very difficult. It has also been revealed that the use of a heating temperature that exceeds 900° C., will result in low adhesive strengths. This is interpreted as follows. When the heating temperature becomes high, the melt of the Mn-Cu alloy will be more exuded out of the joint surface by the pressure application, and alloying of the Mn-Cu alloy with the copper foil will proceed to naturally reduce the Mn content, so that the adhesive strength will be lowered. Accordingly, a proper Mn content is required for increasing the bonding force of the joint body based on the reaction between the a silicon compound of ceramics and Mn.

As the heating period of time, a short time of 1–10 seconds is preferable. An excessively long time is considered disadvantageous because the reaction between Mn and Si becomes excessive, resulting in a lowered adhesive strength.

The application of pressure is necessary in order to promote the spread of the melt and to let the melt be in an intimate contact with the surface of the ceramics. As the applied pressure, values of from at least 0.01 kg/mm$^2$ to at most 1 kg/mm$^2$, particularly 0.02-0.5 kg/mm$^2$, are preferable. Excessive pressure application may damage the ceramics.

Example 3

An SiC sintered body containing 2 weight-% of BeO, the balance being SiC (surface roughness: 2 μm), an Al$_2$O$_3$ sintered body (surface roughness: 3 μm) and an Si$_3$N$_4$ sintered body (surface roughness: 3 μm) were subjected to the metallization and bonding in the following manner.

(1) A foil of an Mn-Cu alloy containing 37.8 weight-% of Mn and 62.2 weight % Cu, and having a thickness of 50 μm and a copper foil having a thickness of 100 μm or a nickel foil having a thickness of 50 μm were stacked on the ceramics. Heating and bonding were carried out in the same manner as described in Example 2.

(2) A foil of an Mn-Ni alloy containing 60 weight-% of Mn and 40 weight % Ni, and a copper foil having a thickness of 100 μm or a nickel foil having a thickness of 50 μm were stacked on the ceramics. Heating was conducted at 1018° C. under a pressure of 0.05 kg/mm$^2$.

(3) A foil of 42.5% Ti-57.5% Mn alloy having a thickness of 50 μm and a copper foil of 100 μm thick or a nickel foil of 50 μm thick were stacked on ceramics. Heating was conducted at 1175° C. under a pressure of 0.05 kg/mm$^2$ for one to several seconds.

(4) A manganese film of 2.5 μm thick was formed on ceramics by vacuum evaporation. Heating was conducted at 700° C. for 1 minute, and then a copper plating of 5 μm thick or a nickel plating of 5 μm thick was formed on the metallized surface. The plated ceramics were heated at 675° C. 5 to 10 minutes.

(5) A composite film of 2.5 μm thick was formed by vacuum evaporation of a 37.5% manganese-62.5% copper alloy. Heating was conducted at 700° C. for one minute. Then, a copper electro-plating or nickel electro-plating was formed on the metallized surface and the plating carrying ceramics were heated to 675° C. for 5 to 10 minutes.

(6) A paste was prepared in which manganese powder of a mean particle size of 20 μm was dispersed in a mixture of nitrocellulose and butylacetate. Metallization was conducted at 850° C. for 5 minutes. Another paste was prepared in which manganese powder had a particle size of less than 2 μm.

The pastes were separately coated by a screen printing process on the ceramics and were fired (metallized) at 800° C. for 5 minutes. Then, a copper or nickel electro-plating of 2 μm thick was formed by electro-plating. Heating was conducted at 675° C. for 5 to 10 minutes.

(7) A paste containing a 37.5% manganese-62.5% copper alloy powder of less than 2 μm and a paste containing a mixture of manganese powder of less than 2 μm and copper powder of less than 2 μm were prepared in the same manner as in (6). Metallization and bonding were carried out in the same manner as in (6).

The other joining conditions and the conditions of the separation test were the same as in Example 1.

TABLE 1

| Forming method | Member to be joined | Ceramics | | | | | | | |
|---|---|---|---|---|---|---|---|---|---|
| | | SiC | | | Al$_2$O$_3$ | | | Si$_3$N$_4$ | |
| | | None | Cu | Ni | None | Cu | Ni | None | Cu |
| Alloy foil | Cu—Mn | ◎ | ◎ | ◎ | ◎ | ◎ | ◎ | ○ | Δ |
| | Ni—Mn | ◎ | ◎ | ◎ | ○ | ○ | ○ | x | x |
| | Ti—Mn | ◎ | ◎ | ○ | ○ | ○ | ○ | x | x |
| Evaporated film | Mn | ◎ | ◎ | ◎ | ◎ | ○ | ○ | — | — |
| | Mn—Cu alloy | ◎ | ◎ | ○ | ○ | ○ | ○ | — | — |
| Paste | Mn powder (at most 20 μm) | Δ | Δ | x | — | — | — | x | x |
| | Mn powder (at most 2 μm) | ◎ | ◎ | ○ | — | — | — | x | — |

TABLE 1-continued

| Forming method | Member to be joined | Ceramics | | | | | | | |
|---|---|---|---|---|---|---|---|---|---|
| | | SiC | | | $Al_2O_3$ | | | $Si_3N_4$ | |
| | | None | Cu | Ni | None | Cu | Ni | None | Cu |
| | Cu—Mn alloy (at most 2 μm) | ◎ | ◎ | ○ | — | — | — | — | — |
| | Cu powder —Mn powder (at most 2 μm) | ○ | ○ | ○ | — | — | — | — | — |

Note:
In case of manganese alloy foils, members to be joined are foils of copper or nickel.
In cases of evaporated manganese containing films and manganese containing pastes, members to be joined are electro-plating films of copper or nickel.

In the table, "none" signifies a sample in which any member to be joined was not joined in order to assess the state of a metallized film. In this case, a BN plate was inserted between the manganese-copper alloy foil and jig 5 in FIG. 1. The BN plate has no wettability with the alloy foil.

In the table, ◎ in the case of "none" indicates a metallized film which was smooth and had good adhesion, ○ one which was somewhat low in adhesion, Δ one which was somewhat inferior in smoothness and somewhat low in adhesion, and × one which was inferior in smoothness and/or adhesion.

In the table, ◎ in the case of employing a member to-be-joined was a sample which had a remarkably high joining strength and which was ruptured in the member to-be-joined in the separation test, ○ a sample which had a high joining strength, Δ a sample which had a low joining strength, and × a sample which had a conspicuously low joining strength.

Example 4

Figure 5:
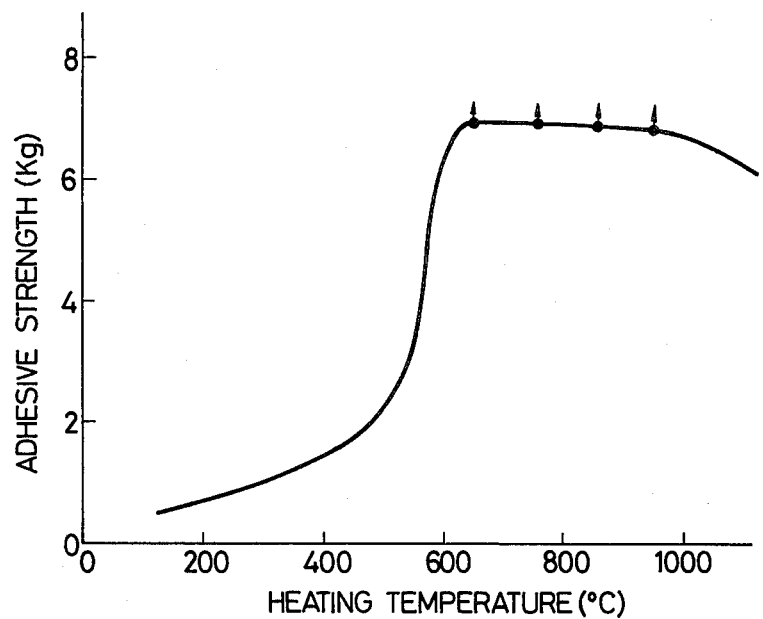
FIG. 5 is a graph showing the adhesive strength of a 3-mm-wide interface between a metallized layer and a SiC substrate versus the heating temperature in an example of the present invention.

An SiC electric insulator (surface roughness: 2 μm) sintered by using 5 weight-% of BeO as a sintering aid and the balance being SiC, and organo-silicone as a coking agent was employed as a substrate. An Mn film being 2 μm thick was formed on the surface of the substrate by the electron-beam vaporization process in vacuum. Such structure was subsequently heated at each of various temperatures as shown in FIG. 5 in argon gas for 1 minute, to cause SiC and Mn to react. Further, an Ni layer 5 μm thick was formed on the Mn film by the electroplating process, and the resultant structure was heated and held at 700° C. for 10 minutes so as to join the Ni layer and the Mn layer by diffusion. In order to assess the adhesion between the resultant metallized layer and the SiC substrate, a Cu foil, 200 μm thick, was soldered onto the Ni layer, and the adhesive strength of an area of 3 mm×3 mm was measured. The result is shown in FIG. 5. The adhesive strength was about 7 kg at 600°–1000° C., rupture occurred within the solder layers in all the samples, and very high adhesion strengths were exhibited.

Example 5

Figure 6:
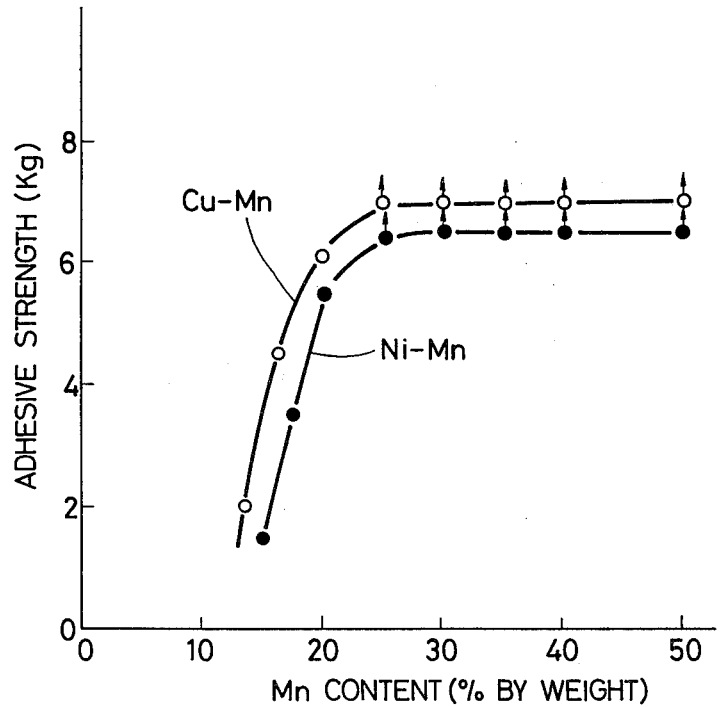
FIG. 6 is a graph showing the adhesive strength of an interface similar to that in FIG. 5 versus the Mn content of a Cu-Mn or Ni-Mn alloy in another example of the present invention.

An SiC sintered compact (surface roughness: 2 μm) obtained by using 2% by weight of AlN as sintering aid, the balance being SiC was employed as a substrate. Cu-Mn or Ni-Mu alloy film, 2.5 μm thick, was formed by the vacuum evaporation on the substrate. Subsequently, the resultant structure was heated at 700° C. in vacuum for 1 minute so as to cause SiC and Mn in the alloy to react. Further, an Ni film, 5 μm thick, was formed on the Cu-Mn or Ni-Mn alloy layer by the electroplating process, and a diffusion treatment was conducted by heating and holding the resultant structure at 675° C. for 10 minutes. In order to assess the adhesion between the resultant metallized layer and the SiC substrate, a Cu foil was soldered onto the Ni plating layer and the adhesive strength of an area of 3 mm×3 mm was evaluated as in Example 4. The result is shown in FIG. 6. In both the cases of Ni and Cu, the adhesive strengths were about 7 kg or above at 25 atomic-% or more, and rupture occurred within the solder layers in all the samples.

The metallized samples of 60 atomic-% Cu-40 atomic-% Mn and 50 atomic-% Ni-50 atomic-% Mn were subjected to the separation test after performing a test of 1,000 thermal cycles over −50° C. to +150° C. Then, any degradation in adhesion was noted, and good reliability was exhibited.

Example 6

The samples obtained in Example 2 having a metallized film of the manganese-containing layer and a copper foil were subjected to etching to remove the film except the portions for a pair of electrodes. The surface conditions were inspected to obtain the following results. For comparison, tests were conducted in which a conventional molybdenum-manganese paste was coated and fired at 1550° C. Measurements was made at 20° C.

TABLE 2

| Applied voltage (V) | Surface leakage current (A) | | | |
|---|---|---|---|---|
| | As etched* | Ultrasonic** cleaning | Sand-blasting*** | Mo—Mn paste |
| 50 | $5 \times 10^{-6}$ | $1 \times 10^{-10}$ | $1 \times 10^{-11}$ | $1 \times 10^{-6}$ |
| 100 | — | $3 \times 10^{-10}$ | $6 \times 10^{-11}$ | — |
| 200 | — | $6 \times 10^{-10}$ | $3 \times 10^{-10}$ | — |
| 300 | — | $1 \times 10^{-9}$ | $7 \times 10^{-10}$ | — |
| 400 | — | $5 \times 10^{-9}$ | $2 \times 10^{-9}$ | — |
| 500 | — | $1 \times 10^{-8}$ | $6 \times 10^{-9}$ | — |
| 600 | — | $2 \times 10^{-8}$ | $1 \times 10^{-8}$ | — |
| 700 | — | $7 \times 10^{-8}$ | $4 \times 10^{-8}$ | — |
| 800 | — | $1 \times 10^{-7}$ | $8 \times 10^{-8}$ | — |
| 900 | — | $3 \times 10^{-7}$ | $1 \times 10^{-7}$ | — |
| 1000 | — | — | $5 \times 10^{-6}$ | $1 \times 10^{-3}$ |

Notes:
*Etched surfaces were rinsed with pure water.
**Etched surfaces were rinsed with pure water, and then the rinsed surfaces were cleaned with ultrasonic cleaner in aceton.
***After rinsing the surfaces with water, the surfaces were polished by sand-blasting and rinsed with pure water.

Compared with metallized ceramic surface using the conventional Mo-Mn paste, the ceramic surfaces according to the present invention are much less deteriorated than was the former.

Example 7

Samples obtained in Example 2 were re-heated in air. As a result, it has been found that the ceramics of the present invention showed no degradation in adhesive strength till 600° C. Even at 650° C. a slight decrease in adhesive strength was observed as shown below.

The samples were also subjected to a heat-cycle test of ($-50°$ C.$\sim +150°$ C.)$\times 1000$ times, but no appreciable decrease in adhesive strength was observed.

TABLE 3

| Re-heating Temp. (°C.) | Adhesive strength (kg) |
|---|---|
| 100 | More than 19 (ruptured at Cu foil) |
| 500 | More than 19 (ruptured at Cu foil) |
| 600 | More than 19 (ruptured at Cu foil) |
| 650 | 18 |
| 700 | 10 |
| 750 | 5 |

Example 8

To the sample obtained in Example 2 was soldered a silicon diode. The structure of this device consists of diode-solder-copper foil-Mn-containing layer-SiC.

On the other hand, another silicon diode was soldered to a nickel plating formed on a Mo-Mn metallized layer. The Mo-Mn metallized layer was formed by using a conventional Mo-Mn paste fired on a SiC ceramic. The nickel plating was necessary to assure the wettability with solder.

In the device according to the present invention, the thickness of the SiC ceramic was 0.6 mm and the copper foil 50 μm. In the conventional device, the thickness of SiC ceramic was 0.6 mm and the nickel plating 0.5 μm.

As to the above-mentioned devices, initial thermal resistances and thermal resistances after 1000 heat cycles of $-50°$ C.$\sim +150°$ C. were measured. The heat resistance was calculated by dividing the difference of the temperature $T_1$ at the interface between the diode and solder layer and the bottom surface temperature $T_2$ of SiC ceramics with the thermal quantity Q of generation in the diode $(T_1 - T_2)/Q$.

TABLE 4

| | Thermal Resistance (°C./W) | |
|---|---|---|
| | Initial | After heat cycle |
| Conventional | 0.64~0.80 | 0.8~1.2 |
| Invention | 0.54 | 0.55 |

What we claim is:

1. A method for metallizing a sintered ceramic containing a silicon compound which is reactable with manganese at a temperature lower than the melting point of manganese, which comprises forming a manganese-containing metal layer on a desired surface of the ceramic and heating the metal layer to a temperature lower than the melting point of manganese to effect the metallization reaction between silicon atoms of the silicon compound and manganese atoms, wherein prior to the reaction the metal layer is brought into an intimate contact with the surface of the ceramic in a manner that there is substantially no minute gap between the metal layer and the ceramic.

2. A method according to claim 1, wherein the metal layer is a film of a member selected from the group consisting of manganese, manganese-copper alloy, manganese-nickel alloy, manganese-titanium alloy and mixtures thereof, the film being formed by vacuum evaporation, sputtering or plasma spraying on the ceramic.

3. A method according to claim 1, wherein the metal layer is a melt of an alloy selected from the group consisting of manganese-copper, manganese-nickel and manganese-titanium, the metal layer being pressured to the surface of the ceramic by means of another solid member.

4. A method according to claim 3, wherein the metallization reaction takes place substantially at the same time of the formation of the melt.

5. A method according to claim 2 or 3, wherein the manganese alloy is selected from the group consisting of a manganese alloy containing 25 by 45% by weight of copper, a manganese alloy containing 50 to 70% by weight of nickel and a manganese alloy containing 42 to 43% by weight of titanium.

6. A method metallizing sintered ceramics comprising the step of coating a desired surface of a sintered silicon carbide ceramic having a surface roughness of at most 5 μm with a paste, which comprises manganese powder dispersed in a dispersant, said manganese powder having a particle size smaller than the surface roughness, the step of removing the dispersant from said paste and forming a metal layer on the ceramic surface, and the step of heating the resultant structure to a temperature lower than the melting point of manganese for a time sufficient to effect a reaction between manganese atoms and silicon carbide.

7. A method of metallizing sintered ceramics as defined in claim 6, wherein said paste contains at least one member selected from the group consisting of copper powder, nickel powder and titanium powder.

8. A method of metallizing sintered ceramics comprising the step of placing a foil on a desired surface of a sintered silicon carbide ceramic, said foil being made of an alloy which contains 25 to 45% of manganese, the balance being copper, an alloy which contains 50 to 70% of manganese, the balance being nickel, or an alloy which contains 42 to 43% of manganese, the balance being titanium; and the step of heating said foil to a temperature of at least the melting point of said alloy, but lower than the melting point of manganese, under application of a pressure of at least 0.01 kg/mm² to melt said foil to form a liquefied metal layer and to cause a reaction between silicon carbide and manganese atoms.

9. A method of metallizing sintered ceramics as defined in any one of claims 6 to 8, wherein a metal material to be bonded is placed on said metal layer, and the resultant structure is heated under pressure to cause the reaction.

10. A method of metallizing sintered ceramics comprising the step of forming a metal layer of manganese or a mixed metal layer of manganese and another metal on a desired surface of sintered aluminum oxide by vacuum evaporation or sputtering, and the step of heating the resultant structure to a temperature lower than the melting point of manganese for a time sufficient to perform a reaction between manganese atoms and silicon oxide in the alumina ceramic.

11. A method of metallizing sintered ceramics comprising the step of coating a desired surface of a sintered alumina ceramic having a surface roughness of at most 5 μm with a paste which comprises manganese powder dispersed in a dispersant, said manganese powder having a particle size smaller than the surface roughness, the step of removing the dispersant of said paste and forming a metal layer on the alumina surface, and the step of heating the resultant structure to a temperature lower than the melting point of manganese for a time sufficient to effect a reaction between manganese atoms and silicon oxide in the alumina ceramic.

12. A method of metallizing sintered ceramics as defined in claim 11, wherein said paste contains at least one member selected from the group consisting of copper powder, nickel powder and titanium powder.

13. A method of metallizing sintered ceramics comprising the step of placing a foil on a desired surface of a sintered alumina ceramic containing silicon oxide, said foil being made of an alloy which contains 25 to 40% of manganese, the balance being copper, an alloy which contains 50 to 70% of manganese, the balance being nickel, or an alloy which contains 42 to 43% of manganese, the balance being titanium; and the step of heating said foil to a temperature of at least the melting point of said alloy but lower than the melting point of manganese under application of a pressure of at least 0.01 kg/mm$^2$ to melt said foil to form a liquefied metal layer and to cause a reaction betwen the silicon oxide in the alumina ceramic and manganese atoms in the manganese alloy.

14. A method of metallizing sintered ceramics as defined in any one of claims 10 to 13, wherein a metal material to be bonded is placed on said metal layer, and the resultant structure is heated to a temperature lower than the melting point of the metal material under pressure to cause the reaction.

15. A method of metallizing sintered ceramics according to claim 1, wherein the silicon compound contained in the sintered ceramic is SiC or silicon oxide.

* * * * *